Patented Dec. 20, 1932

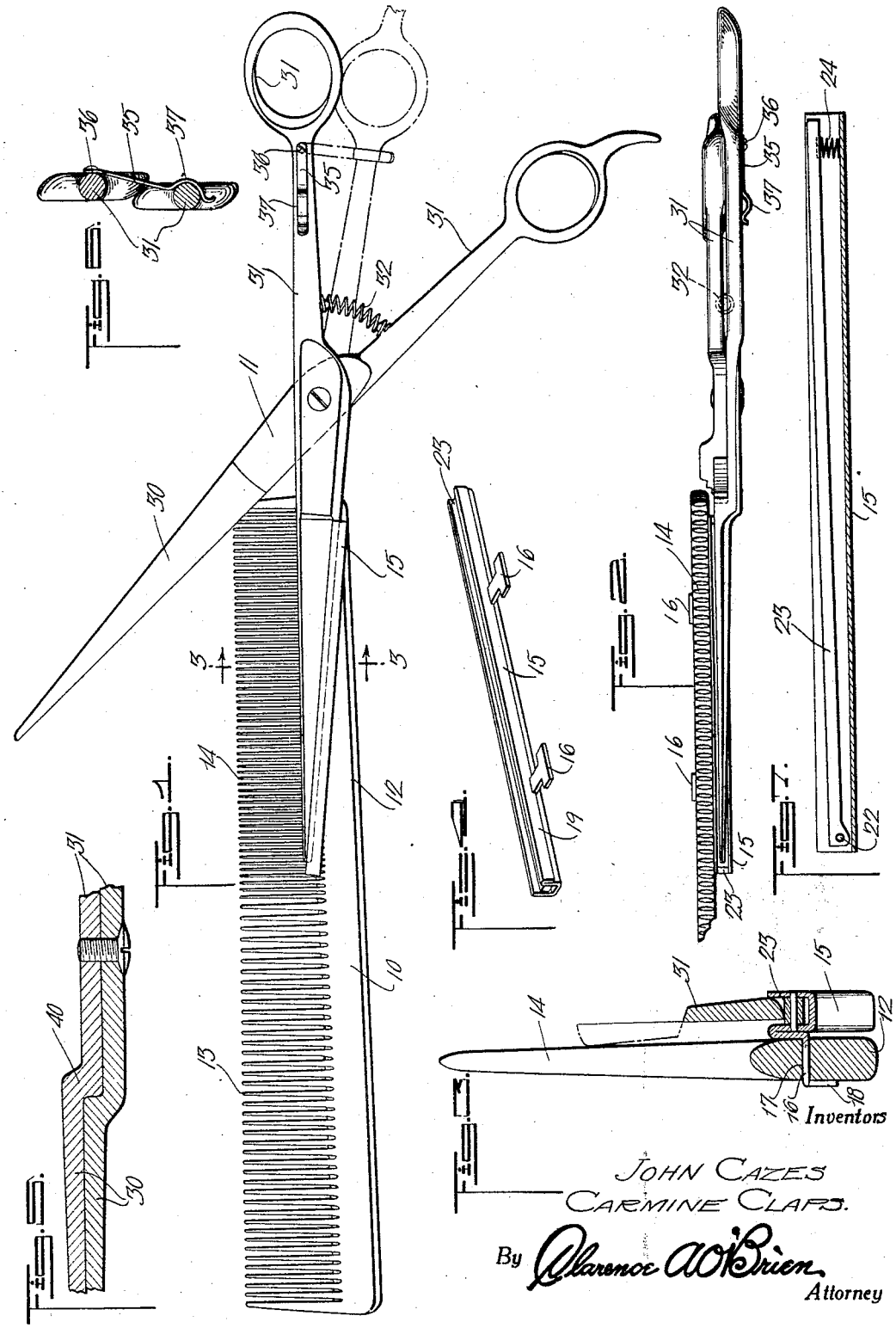

1,891,303

UNITED STATES PATENT OFFICE

JOHN CAZES AND CARMINE CLAPS, OF NEW YORK, N. Y.

BARBER'S COMB

Application filed December 19, 1931. Serial No. 582,136.

The present invention relates to new and useful improvements in combs, and more particularly it pertains to a comb especially adapted for use by barbers.

5 Ordinary barber's combs present difficulty in handling in the cutting of hair in that it requires constant attention upon the part of the barber to maintain a pair of shears parallel with the comb and at all times in proper 10 cutting relation thereto.

It is one of the objects of the present invention to provide means whereby a pair of shears may be supported relative to a comb for the purpose of cutting hair.

15 It is a further object of the invention so to construct the comb that the shears will be maintained in proper position against accidental displacement with relation thereto.

A further object of the invention resides in 20 a new and novel construction whereby the shears supporting member may be attached to any comb of conventional construction.

With the above and other objects in view, reference will be had to the accompanying 25 drawing, in which;

Figure 1 is a view in elevation showing a comb and a pair of shears, and illustrating the manner of use of the device of the present invention, 30 Figure 2 is a top plan view thereof showing a portion of the comb broken away, Figure 3 is a transverse sectional view taken on the line 3—3 of Figure 1, Figure 4 is a perspective view of the comb 35 attachment, Figure 5 is a fragmentary longitudinal sectional view taken through the shears, Figure 6 is a transverse sectional view taken through the handle of the shears and 40 showing the manner in which the handles are secured together, and;

Figure 7 is a longitudinal sectional view of the comb.

Referring specifically to the drawing, the 45 reference numeral 10 designates a comb and 11 designates a pair of barber's shears.

The comb consists of a back member 12, a plurality of coarse teeth 13 and a plurality of fine teeth 14.

50 Carried by the comb and preferably arranged adjacent the group of fine teeth 14, there is a shears supporting member 15. This shears supporting member is secured to the comb by means of tongue like extensions 16 which project through openings 17 in the comb and which are bent downwardly along the side of the comb as indicated at 18 in Figure 3. The extensions 16 are preferably formed as integral portions of a flange 19 which in turn is integral with one of the side walls of the channel shaped comb supporting member 15.

Mounted within the comb supporting member 15, and pivotally secured thereto at one end as at 22, there is a magnetic member 23. This member is formed of metal and is of the permanent magnet type. The opposite end of the magnetic member 23 is supported upon a spring 24 interposed between said member and the bottom of the channel shaped comb supporting member 15. By this means the magnetic member 23 is free to rock about its pivotal point 22 and the spring 24 serves to maintain the same normally in the position in which it is shown in Figure 7.

The shears 11 comprise blade portions 30 and handle portions 31 and interposed between the handle portions 31 there is a spring or the like 32 which tends to spread the handle portions 31 and to maintain the blade of the shears open.

Means is provided to retain the handle members in their closed position when not in use, and this means consists of a resilient member 35 rigidly secured as at 36 to one of the handle members and having a curved portion 37 which is adapted to receive the other handle member. By this means the handle members are retained together when the shears are not in use.

In use, the comb is engaged with the hair to be cut in the usual manner. One of the blades of the shears is supported upon the magnetic member 23 within the channel like shear supporting member 15 as illustrated in Figure 1. Due to the magnetism of the magnetic bar 23, the blades of the shears will be attached thereto and the said blades will be maintained in proper operating position in the member 15. If now the shears be operated, the blade which is not in engagement with the blade supporting member will be moved towards that blade which is and the cutting operation will be completed.

The blades of the shears are offset as indicated at 40 in Figure 5 in order that the blades thereof may occupy a position in close contact with the teeth of the comb during the cutting operation.

From the foregoing, it is apparent that the present invention provides a new and novel comb attachment by means of which a pair of hair cutting shears may be supported in proper relation to the hair being cut, and that the device prevents slipping of the shears relative to the comb and a consequent irregular cutting of the hair.

While the invention has been herein illustrated in what may be termed a preferred form, it is to be understood that the invention is not to be limited to the specific constructions herein shown, but that it may be carried out in other forms without departing from the spirit thereof.

Having thus described the invention, what is claimed as new, and what it is desired to secure by Letters-Patent of the United States, is:

1. In a comb, a shears supporting member comprising a channel shaped member separately attached to said comb, and a magnetic shears supporting member carried by said channel shaped member.

2. In a comb, a shears supporting member comprising a channel shaped member separately attached to said comb, and a magnetic shears supporting member carried by said channel shaped member, and being pivotally attached thereto.

3. In a comb, a shears supporting member comprising a channel shaped member separately attached to said comb, and a magnetic shears supporting member carried by said channel shaped member, and being pivotally attached thereto, at one end and having its other end resiliently mounted.

4. In a comb, a shears supporting member comprising a channel shaped member separately attached to said comb, and a magnetic shears supporting member carried by said channel shaped member, said magnetic shears supporting member being pivotally mounted at one of its ends and having its free end resting upon a coil spring mounted in the bottom of the channel member.

5. A barber's comb comprising a comb body having a plurality of openings therethrough, a comb supporting member, and means carried by the comb supporting member and adapted for engagement in said openings to secure the comb supporting member to the comb.

6. A barber's comb comprising a comb body having a plurality of openings therethrough, a comb supporting member, and means carried by the comb supporting member and adapted for engagement in said openings to secure the comb supporting member to the comb, said last mentioned means comprising integral tongue like extensions.

In testimony whereof we affix our signatures.

JOHN CAZES.
CARMINE CLAPS.